United States Patent
Hasushita

[11] Patent Number: 5,926,657
[45] Date of Patent: Jul. 20, 1999

[54] CAMERA HAVING REAL-IMAGE FINDER AND CONTROL METHOD THEREOF

[75] Inventor: Sachio Hasushita, Hokkaido, Japan

[73] Assignee: Asahi Kogaku Kogyo Kabushiki Kaisha, Tokyo, Japan

[21] Appl. No.: 09/028,897

[22] Filed: Feb. 24, 1998

[30] Foreign Application Priority Data

Feb. 25, 1997 [JP] Japan .................................. 9-056992

[51] Int. Cl.[6] ........................... G03B 13/16; G03B 13/36
[52] U.S. Cl. ......................................................... 396/148
[58] Field of Search .................................. 396/148, 150, 396/149, 382, 373

[56] References Cited

U.S. PATENT DOCUMENTS

| | | | |
|---|---|---|---|
| 2,881,686 | 4/1959 | Ruhle | 396/150 |
| 4,358,190 | 11/1982 | Sakai | 396/148 |
| 5,223,873 | 6/1993 | Tsuboi | 396/148 |
| 5,721,982 | 2/1998 | Wakabayashi et al. | 396/148 |

OTHER PUBLICATIONS

Copy of "The Manual of Photography", Ralph E. Jacobson et al., pp. 112–113, Eighth Edition, (1998).

*Primary Examiner*—W. B. Perkey
*Attorney, Agent, or Firm*—Greenblum & Bernstein, P.L.C.

[57] ABSTRACT

A camera having a real-image finder includes a photographing lens system, a real image type view finder separate from the photographing lens system, a focusing plate having a split image prism placed in the vicinity of an image forming position in which an object image is formed by the real image type view finder, an object distance data detection means, a photographing lens driving motor for moving the photographing lens system to focus the same, a finder driving motor for driving the finder to focus the same, and a controller for controlling the photographing lens driving motor and the finder driving motor in accordance with the object distance data so as to focus the photographing lens system and the finder on an aiming object. The invention is also directed to a control method of a camera having the same.

8 Claims, 6 Drawing Sheets

CAMERA HAVING REAL-IMAGE FINDER AND CONTROL METHOD THEREOF

BACKGROUND OF THE INVENTION

1. Field of the Invention

The present invention relates to a camera having a photographing optical system and a finder optical system separate therefrom, and in particular, it relates to a finder optical system thereof. The present invention also relates to a control method of a camera having a real-image finder.

2. Description of the Related Art

Recent cameras in general, including single lens reflex cameras and compact cameras, are being provided with an automatic focusing function. In a single lens reflex camera, since the focus state of an image formed on a focusing plate within a view finder changes during the focusing operation of the photographing lens, it is possible for a photographer to judge whether or not the photographing lens is focused on an object by the automatic focusing operation while viewing the image through the view finder.

In a camera in which the finder system is provided separately from the photographing lens system, the finder system constitutes a real image telescope or a virtual image telescope, and hence, in general, no focusing mechanism is provided since objects at different object distances can be viewed in an in-focus state due to the human eyes' control ability. Instead, an indicator for lighting a lamp when the object distance is detected is provided in or in the vicinity of the view finder, so that a photographer judges that the object is in focus when the lamp is lit and actuates a shutter.

However, in cameras other than single lens reflex cameras, it is impossible for a photographer to confirm, lo prior to the photographing operation, whether or not the photographing lens can be correctly focused on an object by the automatic focusing operation. Consequently, if the automatic focusing operation is carried out without correctly focusing the object being focused on in the distance detection area of the view finder, or if a malfunction of the automatic focusing system occurs for an object such as a scene through a glass or flames, the object distance of which cannot be easily detected by the distance detection system, the object is not in focus.

Namely, since the confirmation indication such as the lamp within or in the vicinity of the view finder is adapted only to confirm whether the object in the object distance detection area is in focus, if the photographer fails to appropriately operate or the mal-function of the distance detection system occurs, even if the photographer takes a picture after he or she confirms that the lamp is lit, the picture will be out of focus.

Note that the focus state in the view finder can be also confirmed by a focusing plate, as used in a single lens reflex camera, which is provided with fine projections and depressions and is located at the image forming position (focal plane) in which an object image is formed by an objective lens. However, finder optical system for recent compact cameras are very small, so that the focal length of the eyepiece is in the range of approximately 20 to 30 mm, and the ocular magnification thereof amounts to $250/f_e$; wherein $f_e$ is the focal length of the eyepiece lens. This value is extremely high in comparison with the magnification (3 to 5) of an eyepiece of a conventional 35 mm single lens reflex camera. Therefore, if a focusing plate is provided in a finder optical system of a compact camera whose magnification is extremely high, the visual field of a finder looks poorly finished if the pitch of the fine projections and depressions of the focusing plate is not small enough in comparison with that of the focusing plate in a single lens reflex camera. If the pitch of the projections and depressions is small, the diffusibility is reduced and consequently it is difficult to recognize the amount of defocus (focal-shift) of the finder image.

SUMMARY OF THE INVENTION

It is an object of the present invention to provide a view finder for a camera in which a finder optical system is provided independently of a photographing lens system, wherein a photographer can confirm through the finder whether or not the photographing lens system can be focused on an object by an automatic focusing operation if the magnification of an eyepiece of the finder optical system is high.

To achieve the object mentioned above, according to the present invention, there is provided a camera having a real-image finder which includes: a photographing optical system having a movable focusing element; a finder optical system separate from the photographing optical system, the finder optical system having an objective optical system, an image erecting optical system and an eyepiece optical system; a movable finder focusing element provided in the finder optical system, the movable focusing element being separate from the movable focusing element of the photographing optical system; a split image prism provided in the vicinity of an image forming position at which an object image is formed by the objective optical system; an object distance data detector for detecting data representing the object distance; and a driver which drives the movable finder focusing element in accordance with the data representing the object distance detected by the object distance data detector to form an in-focus object image on the split image prism.

The split image prism can be formed on a plane-parallel plate. Alternatively, the split image prism can be formed on a surface of a lens which constitutes the finder optical system or on a surface of a lens which constitutes the eyepiece optical system or on a surface of a prism which constitutes the image erecting optical system.

In an embodiment, the split image prism is visibly provided at the center of the field of view.

According to another aspect of the present invention, there is provided a control method for a camera wherein the camera includes: a photographing optical system having a movable focusing element; a real image type finder optical system separate from said photographing optical system having a movable finder focusing element; a split image prism provided in the real image type finder optical system in the vicinity of an image forming position thereof; an object distance data detector for detecting data representing the object distance; a photographing optical system driver which drives the movable focusing element in accordance with the data representing the object distance detected by the object distance data detector to form an in-focus object image on an image recording media; a finder optical system driver which drives the movable finder focusing element in accordance with the data representing the object distance detected by the object distance data detector to form an in-focus object image on the split image prism; a shutter release button and a photometering switch for photometering a brightness of the object, the photometering switch being turned ON by a half depression of said shutter release button.

This method includes the driving of the finder optical system driver each time the photometering switch is turned ON by a half depression of a shutter release button, and the driving of the photographing optical system driver only when a full depression of the shutter release button takes place.

According to yet another aspect of the present invention, there is provided a camera including: a photographing optical system having a movable focusing element; a real image type finder optical system separate from the photographing optical system having a movable finder focusing element; a split image prism provided in the real image type finder optical system in the vicinity of an image forming position thereof; an object distance data detector for detecting data representing the object distance; a photographing optical system driver which drives the movable focusing element in accordance with the data representing the object distance detected by the object distance data detector to form an in-focus object image on an image recording media; and a finder optical system driver which drives the movable finder focusing element in accordance with the data representing the object distance detected by the object distance data detector to form an in-focus object image on the split image prism.

The present disclosure relates to subject matter contained in Japanese Patent Application No. 09-56992 (filed on Feb. 25, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
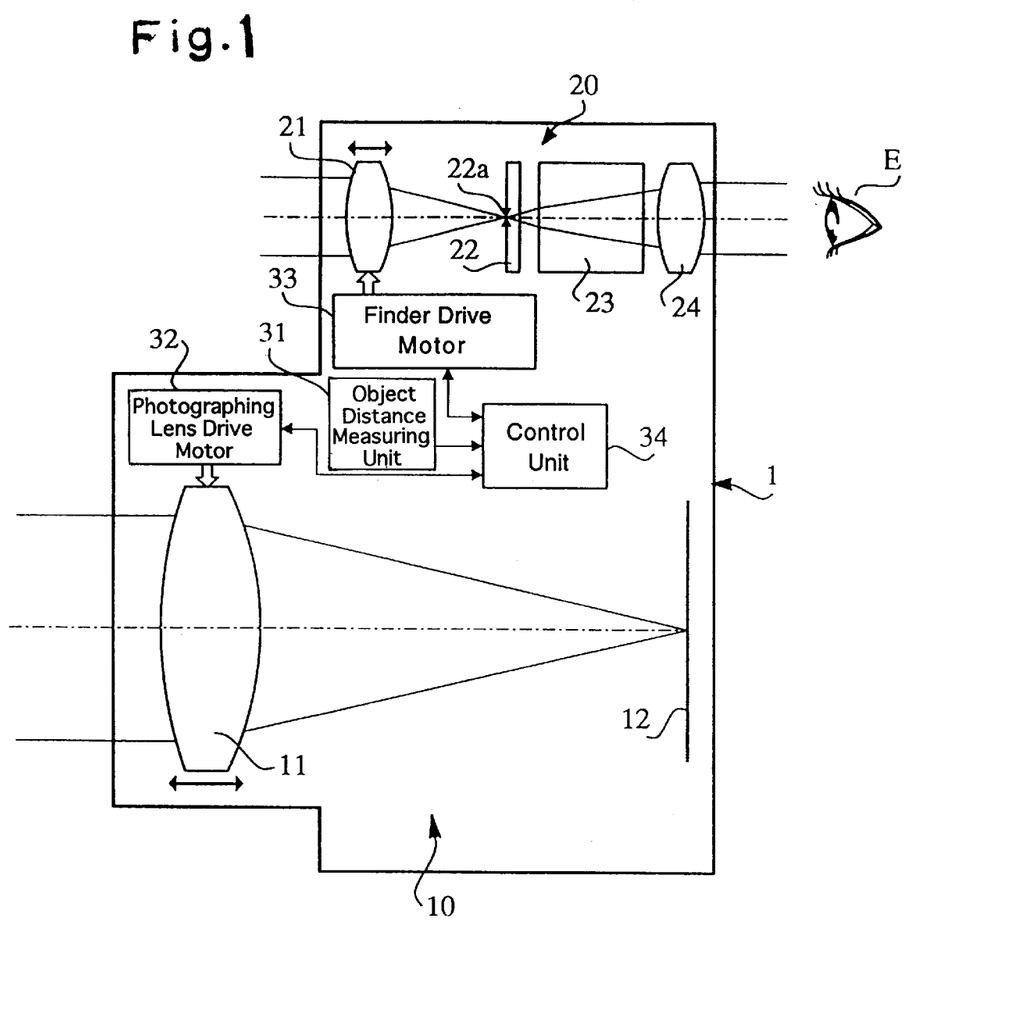
FIG. 1 is a schematic view of a camera according to an embodiment of the present invention.

The illustrated embodiments are applied to a camera having a real-image finder. FIG. 1 shows a conceptual view of an internal structure of the camera 1.

The camera 1 is composed of a photographing optical system 10 having a photographing lens 11 and a film 12, and a real-image finder optical system 20 which is provided independently or separately from the photographing optical system 10. The shutter in the photographing optical system 10 is not shown. The finder optical system 20 is comprised of an objective lens 21, a plane-parallel plate 22 having a split image prism 22a located in the vicinity of an image forming position at which an object image is formed by the objective lens 21, an image erecting optical system 23, and an eyepiece 24. The image erecting optical system 23 can constitute, for example, a Porro prism.

Object light incident upon the camera through the photographing lens 11 reaches the film 12 to form an object image on the film when the shutter (not shown) is actuated. Object light entering the camera through the objective lens 21 forms an object image in the vicinity of the plane-parallel plate 22 through the objective lens 21. The object image thus formed is inverted in the vertical and horizontal directions by the image erecting optical system 23 and reaches a photographer's eye E through the eyepiece 24.

The camera 1 is provided with an active type or passive type object distance measuring unit 31 as an object distance data detection means for detecting data representing the object distance. In the illustrated embodiment, the distance of the object from the camera is directly measured. The data representing the object distance refers not only to the object distance itself, but also the positional data (defocus data) of the photographing lens 11 to a focused state (in-focus position).

The photographing lens 11 is moved by a photographing lens drive motor 32 as a photographing optical system driving means in the optical axis direction. The objective lens 21 of the finder optical system 20 is driven by a finder drive motor 33 as a finder optical system driving means in the optical axis direction to control the focus. The drive motors 32 and 33 are controlled in accordance with control signals supplied from a control unit 34. Namely, the control unit 34 controls the photographing lens drive motor 32 and the finder drive motor 33 in accordance with the object distance data supplied from the object distance measuring unit 31 so that the photographing optical system 10 and the finder optical system 20 are focused on the object.

Figure 2:
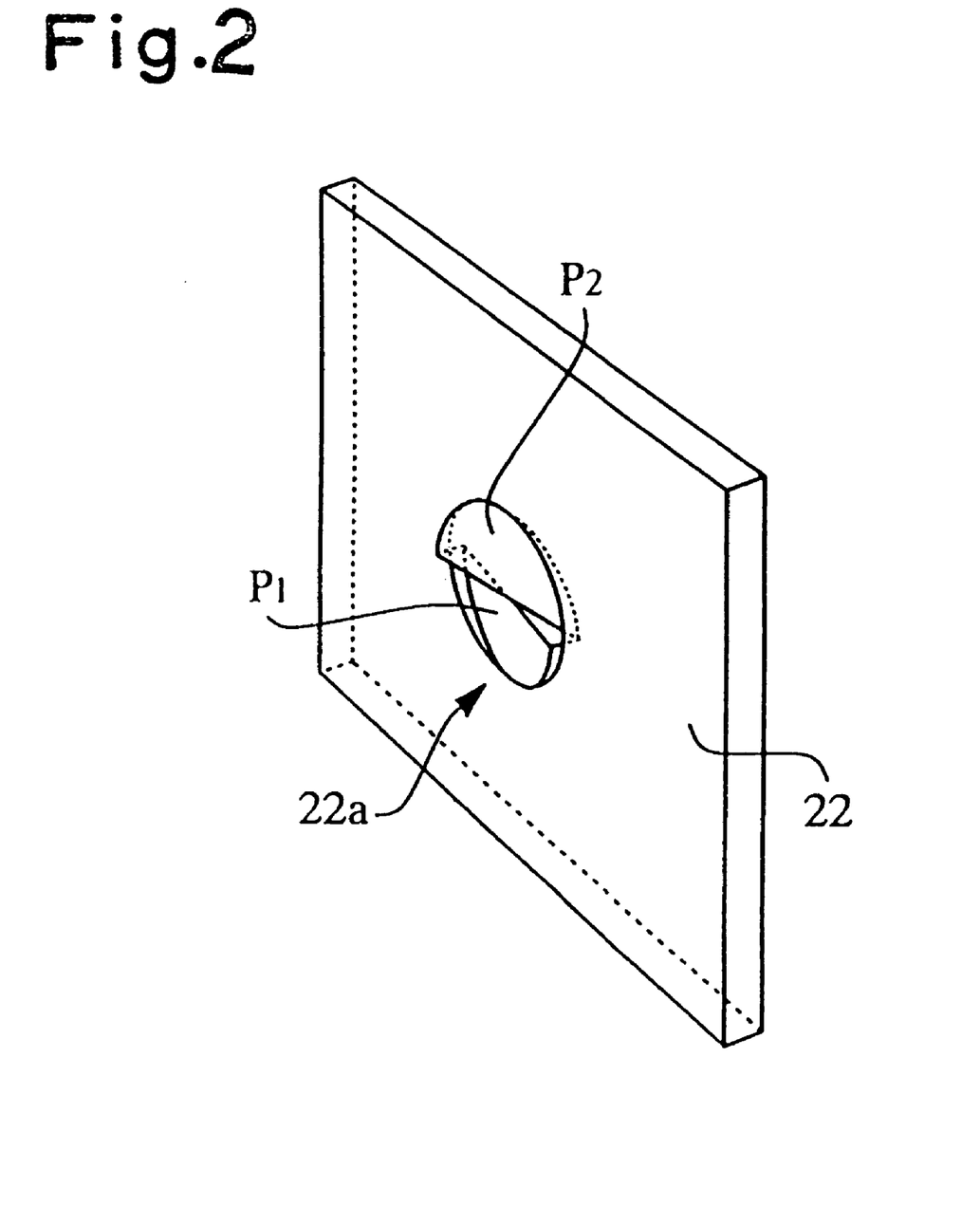
FIG. 2 is a perspective view of a plane-parallel plate of a finder optical system shown in FIG. 1.

The plane-parallel plate 22 is in the form of a rectangular planar plate which is elongated laterally, as shown in FIG. 2. The plane-parallel plate 22 is provided on the center portion thereof with a split image prism 22a which is made of a pair of wedge-shaped thin prisms P1 and P2 which are connected such that the gradient directions thereof are opposite. The photographer who views the finder can see the split image prism 22a at the center of the finder visual field.

Figures 3A, 3B:
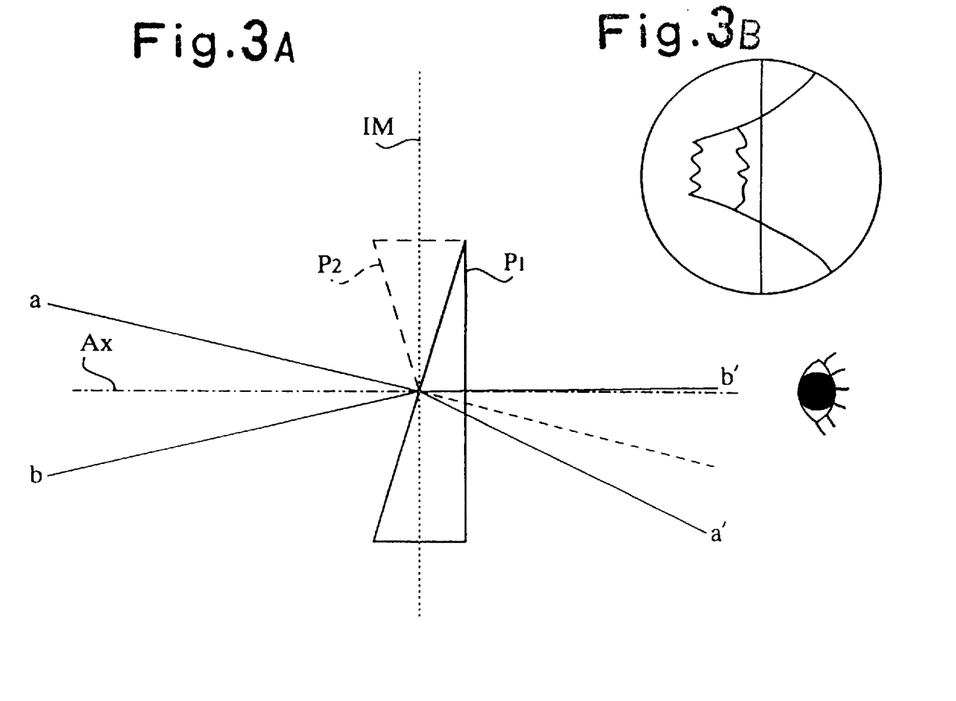
FIGS. 3A and 3B are explanatory views of the operation of a split image prism in an in-focus position.

If the focal plane IM of the objective lens 21 is in-line with the center of the thicknesses of the two intersecting prisms P1 and P2 with respect to the optical axis and the optical axis Ax is in-line with the center of the prisms P1 and P2, as shown in FIG. 3A, the object images which are viewed through the prisms P1 and P2 are continuous in the finder field as shown in FIG. 3B. If the focal plane IM of the objective lens 21 is deviated from the center of the prisms P1 and P2, as shown in FIG. 4A, the object images which are viewed through the prisms P1 and P2 are out-of-line in the finder field as shown in FIG. 4B, since the center of the focal plane which is viewed through the prisms is deviated as indicated at S in FIG. 4A.

Figures 4A, 4B:
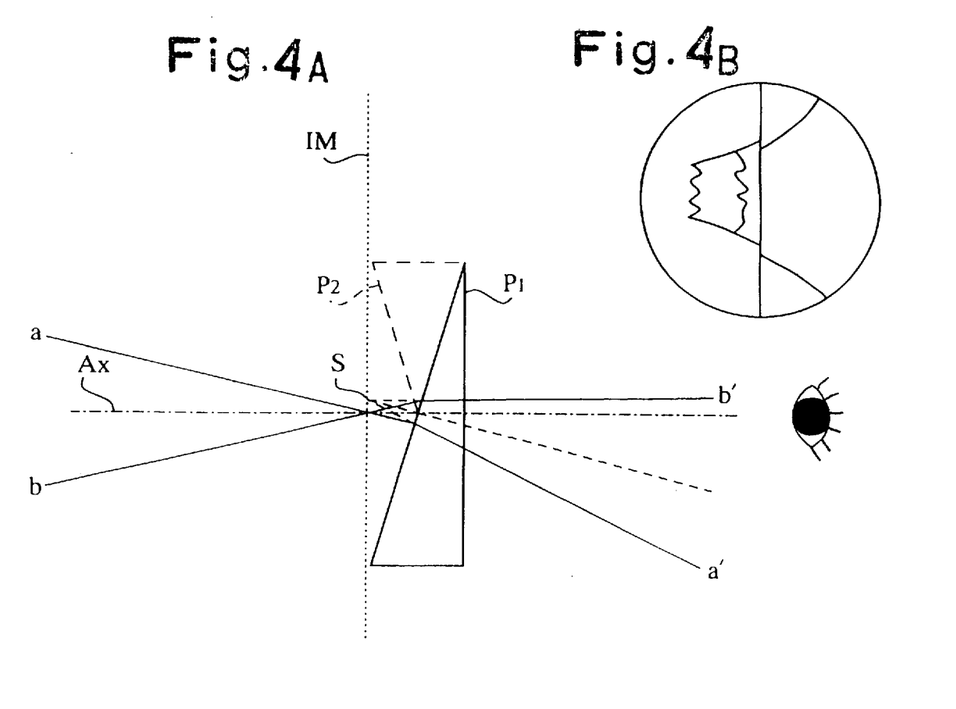
FIGS. 4A and 4B are explanatory views of the operation of a split image prism in an out-of-focus position.

In FIGS. 3A and 4A, the line segments a-a' and b-b' represent the rays which are made incident upon the center of the focal plane and are refracted by the prisms P1 and P2. The line segments a' and b' represent only the rays refracted by the prism P1 and the rays refracted by the other prism P2 are omitted. The rays refracted by the prism P2 are in symmetry with the rays refracted by the prism P1 with respect to the optical axis Ax.

Consequently, if the object images transmitted through the split image prism 22a within the finder are continuous when the objective lens 21 of the finder optical system 20 is moved in accordance with the object distance data, it can be confirmed that the object distance of an aiming object has been correctly measured by the object distance measuring unit and that a clear picture of the in-focus object can be obtained by driving the photographing lens 11 in accordance with the object distance data. Conversely, if the object images transmitted through the split image prism 22a within the finder are out-of-line, it can be confirmed that object distance of an aiming object has not been correctly measured by the object distance measuring unit and that the aiming object is out-of-focus, and that a clear picture of the aiming object has not been obtained.

Figure 5:
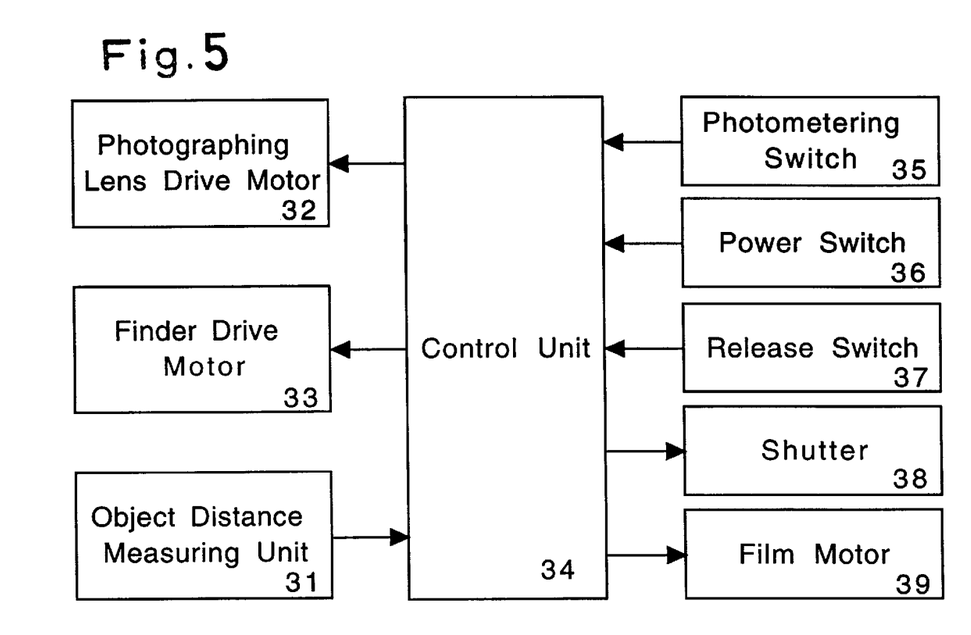
FIG. 5 is a block diagram of a control system of a camera shown in FIG. 1.

FIG. 5 shows a block diagram of a control system of the camera 1. The control unit 34 controls not only the photographing lens drive motor 32 and the finder drive motor 33 in accordance with the object distance data supplied from the object distance measuring unit 31, but also a shutter 38 and a film motor 39, in accordance with switch data supplied from a power switch 36, a photometering switch 35, or a release switch 37. The photometering switch 35 and the release switch 37 are associated with a shutter button (not shown), so that the photometering switch 35 is turned ON by a half depression of the shutter button and the release switch 37 is turned ON by a full depression of the shutter button.

Figure 6:
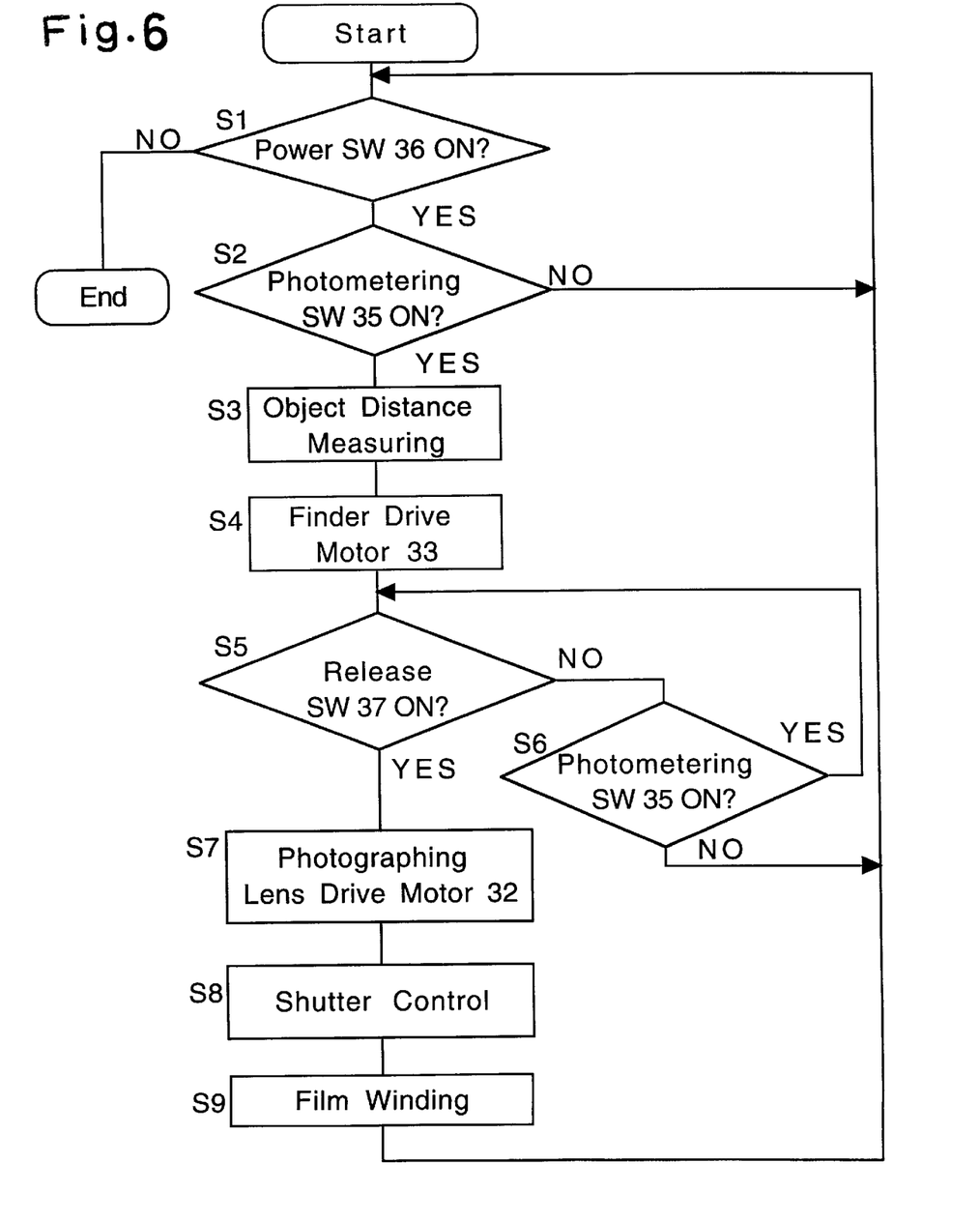
FIG. 6 is a flow chart of the control operation of a camera shown in FIG. 1.

If the power switch 36 is turned ON, the control unit 34 performs the control operation in accordance with the process of the flow chart shown in FIG. 6.

In the loop of steps S1 and S2, if the photometering switch 35 is turned ON before the power switch 36 is turned OFF (steps S1 and S2), the operations at step S3 and steps subsequent thereto are carried out. If the power switch 36 is turned OFF before the photometering switch 35 is turned ON, the control ends.

If the photometering switch 35 is turned ON, the object distance is measured and thereafter the finder drive motor 33 is driven to focus the finder optical system on the aiming object whose object distance has been measured (S3, S4). In the loop of steps S5 and S6, if the release switch 37 is turned ON before the photometering switch 35 is turned OFF, the control proceeds to step S7. If the photometering switch 35 is turned OFF before the release switch 37 is turned ON, the control is returned to step S1 and the operations subsequent to step S1 are repeated.

If the release switch 37 is turned ON, the photographing lens drive motor 32 is driven in accordance with the measured object distance to focus the photographing optical system 10 on the aiming object whose object distance has been measured (S7). If the photographing optical system 10 is focused on an object, the shutter is driven at a predetermined shutter speed (S8), and the object image is formed on the film. Thereafter, the film motor 39 is driven to wind the film by one frame, and the control is returned to step S1 to repeat the above-mentioned operations.

According to the above-mentioned control, when the object distance is measured by depressing the photometering switch 35, the finder optical system 10 is focused on the object, and hence it is possible for a photographer to realize that the object distance of the aiming object has been correctly measured prior to the photographing operation when the object image viewed through the split image prism 22a is in-line.

The camera is preferably provided with a focus lock function wherein once the photometering switch 35 is turned ON to measure the object distance, the measurements are held until the photometering switch 35 is turned OFF. Thus, an framing operation can be carried out while maintaining the in-focus state of a specific object by turning the release switch 37 ON after framing. To measure the object distance again, the photometering switch 35 is turned OFF and is turned ON thereafter. The focus lock function and mechanism thereof is known per se in the art.

Note that the focus of the finder optical system 20 is controlled each time the object distance is measured, however the focus of the photographing optical system 10 is controlled after the release switch is turned ON and therefore the movement of the photographing lens 11 (of a focusing lens group) only takes place once for each photographing operation. Thus, a reduction of power consumption can be achieved.

Figure 7:
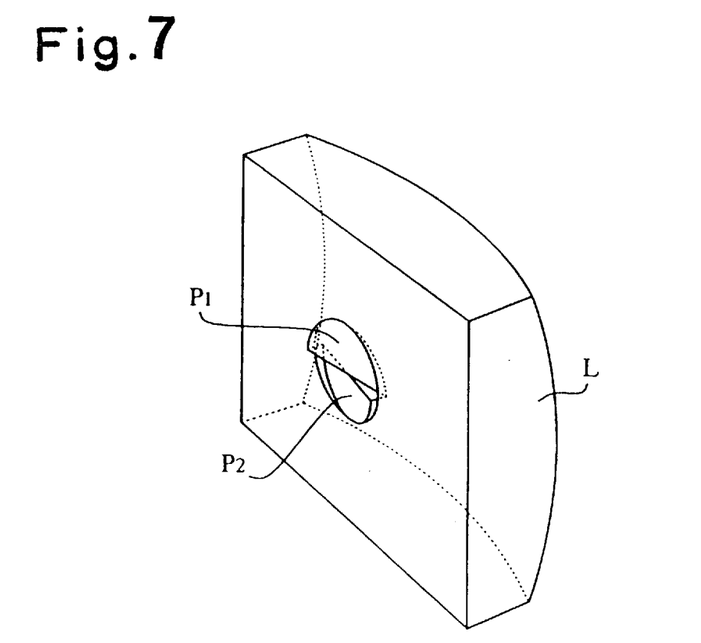
FIG. 7 is a perspective view of a split image prism according to another embodiment of the present invention.
Figure 8:
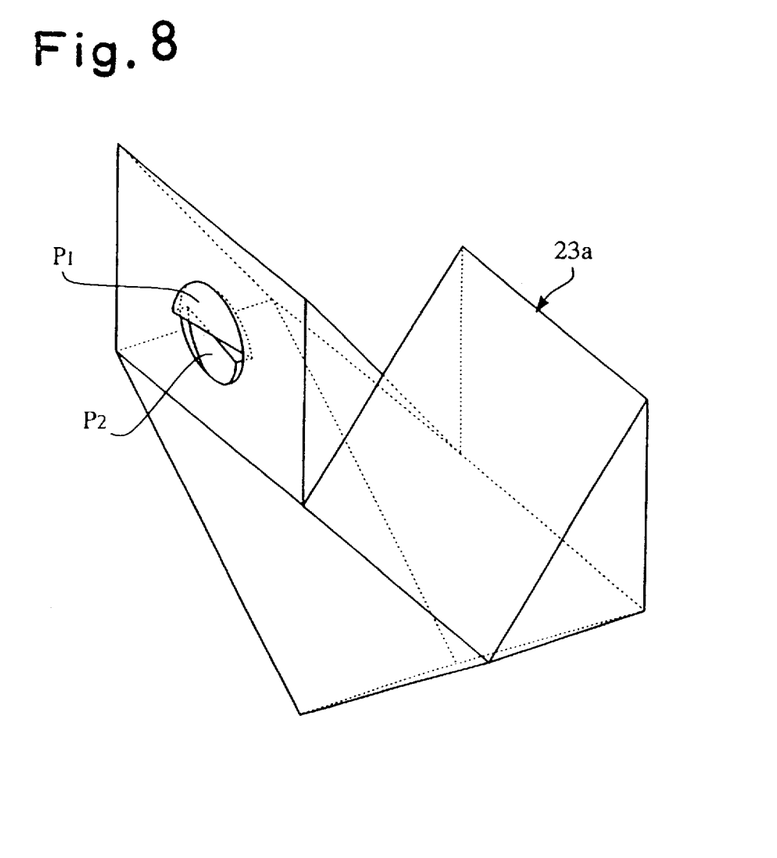
FIG. 8 is a perspective view of a split image prism according to still another embodiment of the present invention.

FIGS. 7 and 8 show two modified locations of a split image prism provided in the finder optical system. In FIG. 7, the split image prism consisting of a pair of prisms P1 and P2 is provided at the center of the planar surface of a plano-convex lens L which constitutes an objective lens system or an eyepiece optical system. In FIG. 8, the split image prism consisting of a pair of prisms P1 and P2 is provided at the center of the surface of the Porro prism 23a on the object side. The Porro prism constitutes an image erection optical system. With the arrangement shown in FIGS. 7 or 8, the split image prism is provided on an existing optical element, and the number of the components can not only be reduced, but also an independent positioning of the split image prism is unnecessary, thus resulting in an easy and accurate positioning of the split image prism.

As can be seen from the foregoing, according to the present invention, whether the photographing optical system is focused on a desired object can be confirmed based on the state of the object image viewed through the split image prism, prior to a photographing operation.

What is claimed is:

1. A camera having a real-image finder comprising:
   a photographing optical system having a movable focusing element;
   a finder optical system separate from said photographing optical system, said finder optical system comprising an objective optical system, an image erecting optical system and an eyepiece optical system;
   a movable finder focusing element provided in said finder optical system, said movable finder focusing element being separate from said movable focusing element of the photographing optical system;
   a split image prism provided in the vicinity of the image forming position at which an object image is formed by said objective optical system;
   an object distance data detector for detecting data representing the object distance; and
   a driver which drives said movable finder focusing element in accordance with the data representing the object distance detected by the object distance data detector to form an in-focus object image on said split image prism.

2. A camera having a real-image finder according to claim 1, wherein said split image prism is formed on a plane-parallel plate.

3. A camera having a real-image finder according to claim 1, wherein said split image prism is formed on a surface of a lens which constitutes the finder optical system.

4. A camera having a real-image finder according to claim 3, wherein said split image prism is formed on a surface of a lens which constitutes the eyepiece optical system.

5. A camera having a real-image finder according to claim 1, wherein said split image prism is formed on a surface of a prism which constitutes the image erecting optical system.

6. A camera having a real-image finder according to claim 1, wherein said split image prism appears to be at the center of the field of view.

7. A control method for a camera, said camera comprising: a photographing optical system having a movable focusing element; a real image type finder optical system separate from said photographing optical system, said finder optical system having a movable finder focusing element; a split image prism provided in said real image type finder optical system in the vicinity of an image forming position thereof; an object distance data detector for detecting data representing the object distance; a photographing optical system driver which drives said movable focusing element in accordance with the data representing the object distance detected by the object distance data detector to form an in-focus object image on an image recording media; a finder optical system driver which drives said movable finder focusing element in accordance with the data representing the object distance detected by the object distance data detector to form an in-focus object image on said split image prism; a shutter release button and a photometering switch for photometering a brightness of the object, said photometering switch being turned ON by a half depression of said shutter release button;

said method comprising:

driving said finder optical system driver each time said photometering switch is turned ON by a half depression of a shutter release button; and driving said photographing optical system driver only when a full depression of the shutter release button takes place.

8. A camera comprising:

a photographing optical system having a movable focusing element;

a real image type finder optical system separate from said photographing optical system having a movable finder focusing element;

a split image prism provided in said real image type finder optical system in the vicinity of an image forming position thereof;

an object distance data detector for detecting data representing the object distance;

a photographing optical system driver which drives said movable focusing element in accordance with the data representing the object distance detected by the object distance data detector to form an in-focus object image on an image recording media; and a finder optical system driver which drives said movable finder focusing element in accordance with the data representing the object distance detected by the object distance data detector such that an in-focus object image on said split image prism is obtained.

* * * * *